June 29, 1971    I. GEBEFÜGI    3,590,111
METHOD OF PRODUCING LIGHTWEIGHT SHAPED ARTICLES CONTAINING
PERLITE OR VERMICULITE Filed Dec. 12, 1967     2 Sheets-Sheet 1

INVENTOR
ISTVAN GEBEFÜGI

United States Patent Office 3,590,111
Patented June 29, 1971

3,590,111
METHOD OF PRODUCING LIGHTWEIGHT SHAPED ARTICLES CONTAINING PERLITE OR VERMICULITE
Istvan Gebefügi, 73 Goldbrunnenstrasse, 8055 Zurich, Switzerland
Filed Dec. 12, 1967, Ser. No. 689,892
Claims priority, application Germany, Dec. 16, 1966, G 48,756
Int. Cl. B29c 25/00; C04b 31/00
U.S. Cl. 264—234                                5 Claims

ABSTRACT OF THE DISCLOSURE

Shaped articles for construction or insulation comprising expanded perlite, vermiculite or a mixture thereof, compounded by a quasi-colloidal binding agent made up from perlite dust and containing mixed crystals of calcium silicate hydrate, calcium aluminosilicate hydrate, and calcium aluminate hydrate produced by the reaction of calcium oxide or dry hydrated calcium oxide with finely divided perlite, the shaped article containing 15 to 40% by weight of the binder based on the solids content thereof. The binder is also useful for making other products, for instance, laminates which have a core sheet of the shaped article and one or more cover sheets of plastic, paper, or other desired material. The invention also comprises a method of making the binder and the shaped articles.

SUMMARY OF THE INVENTION

Figure 1:
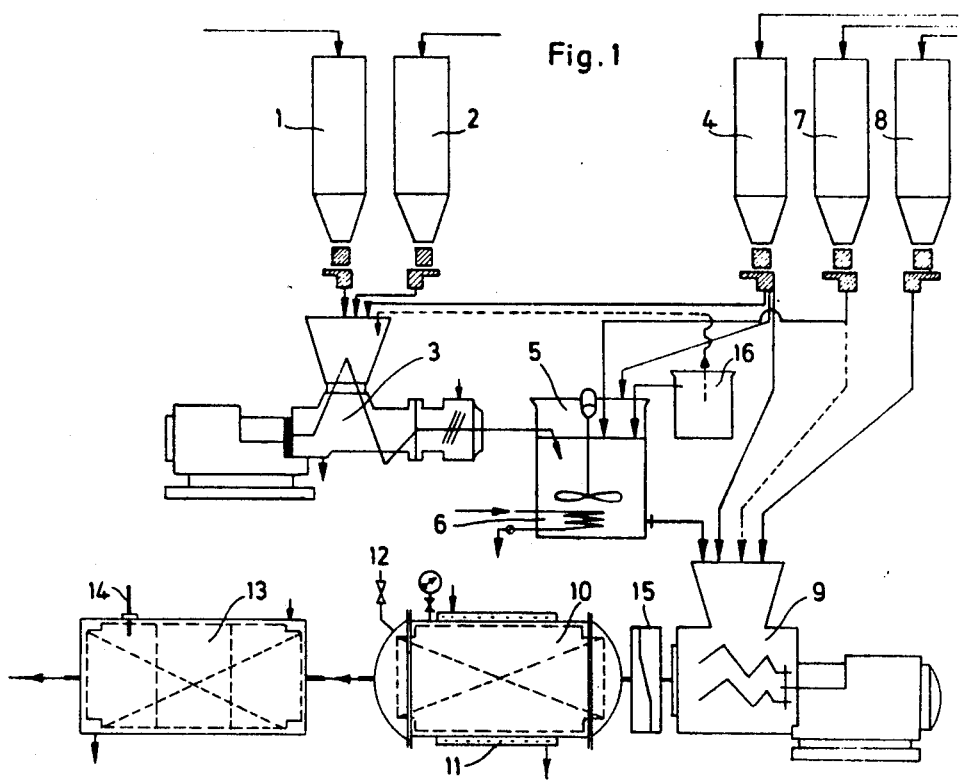

The present invention relates to shaped articles for construction and insulation. An important object of the invention is to provide such articles which contain expanded or "popped" perlite and/or vermiculite. Furthermore, the invention is concerned with the production of an improved binder for the products and for other purposes according to the invention which can be used either alone or combined to form laminates having at least one covering layer of a material such as metal foil, plates, sheets or film of synthetic resin, chipboard panels, compressed laminated wood, and roofing felt.

Perlite is a hydroaluminum silicate from the decomposition or rhyolite lava flows. It consists substantially of 70 to 85 percent $SiO_2$, 12 to 14 percent $Al_2O_3$ and 2 to 3 percent of water. Perlite occurs naturally for instance in Czechoslovakia, Greece, Italy, Japan, Hungary, and in the United States in Nevada, Colorado, and New Mexico. Vermiculite is a hydromagnesium aluminum silicate of undetermined structure containing 8 to 12 percent MgO, 60 to 65 percent $SiO_2$, 6 to 12 percent $Al_2O_3$ and 1 to 4 percent of water.

If ground perlite with a particle size of 0.2 to 3 mm. is heated at 900 to 1250° C. for 2 to 10 minutes, the individual particles increase in volume so that, in accordance with the quality and origin of the mineral, a 6 to 20-fold expansion takes place. Vermiculite can be treated similarly at 850 to 1050° C. Expanded or "popped" perlite is very light and has closed or substantially closed cells, expanded vermiculite has a plate-like structure. Both expanded substances have good thermal insulating properties and they are used for thermal and acoustic insulating material. In the expansion of perlite substantial losses of material in the form of dust and powder are unavoidable. Up till now it has not been possible to find uses for such waste and at the best it can only be sold at a very low price.

The U.S. Pats. 2,884,380, 2,858,227, 2,733,159, 2,585,366, and 2,511,830 describe the use of organic or inorganic binders, such as bitumen or asphalt emulsions, cement, ceramic binders, activated clay, glass, or asbestos to produce shaped articles from expanded perlite for construction and insulating purposes.

Such insulating and construction materials have a specific gravity of 270 to 800 kg./m.³, a thermal conductivity of 0.08 to 0.22 kcal./m. h. ° C. at 20° C. and from 0.15 to 0.5 kcal./m. h. ° C. at 500° C. The compressive strength is 8 to 12 kg./cm.².

In the production of these articles for construction and insulating purposes the requirements or objectives of producing a low heat conductivity on the one hand and a high physical strength on the other are found to be contradictory. Articles made by prior art processes are either comparatively strong but have a high specific gravity and a high thermal conductivity or else, with better thermal conductivity values, have a lower compressive strength and are therefore fragile. Shaped articles which are produced using organic binding agents are inflammable. Also, in known methods of making articles of the type under discussion, it is not possible to make articles, at low expense, which are dimensionally stable, physically resistant, not inflammable, fireproof and light-weight, and possess good thermal and acoustic insulation properties.

It is an object of the invention to produce shaped articles of expanded perlite or vermiculite, or both, using as a binder a material which is produced from waste or dust from expanded perlite.

It is another object of the invention to produce shaped articles which have dimensional stability, physical resistance or strength, the property of being non-inflammable, resistance to decay, a very low specific gravity and which are good heat and acoustic insulators.

It is yet another object of the invention to produce said shaped articles from cheap starting material by a simple and economical method.

It is a further object of the invention to provide a new curable binding agent, for making expanded perlite or vermiculite based articles or for other purposes, from expanded perlite dust or waste.

A further object of the invention is to provide a process for making a binding agent which is purely inorganic and therefore not inflammable and suitable for binding varied types of material, such as inorganic materials especially those containing silica. Another object of the invention is to produce such a binder which is not subject to decay.

Further objects and advantages of the invention will become apparent from the following detailed description.

In accordance with one aspect, the present invention consists in the method of making an inorganic binder comprising the steps of: Mixing expanded perlite, preferably with a particle size of approximately 0.001 to approximately 3 mm., for instance perlite dust or waste, with calcium oxide or dry hydrated calcium oxide with a molar ratio of $SiO_2$ in the perlite and the oxide or the CaO in the hydroxide of about 1.1 to 2.0, to produce a dough-like material containing water, kneading the dough-like material at between 20 and 160° C. for approximately 2 to approximately 10 minutes, adding further water, and then holding the material at a temperature between approximately 60 and approximately 95° C. from about 10 minutes to about 3 hours.

Preferably, the particle size of the perlite used in making the binder is between approximately 0.01 to 1 mm. The term "dough-like" as used in the present specification and claims indicates that the material cannot be stirred but only kneaded. It is quasi-colloidal in character. In this state, if an attempt is made to use a conventional stirrer, movement or flow of the material stops almost immediately the stirrer is stopped. The dough-like material is preferably prepared in a kneading apparatus developing compressive and shearing forces.

A type of kneader suitable for the method in accordance with the invention and developing sufficient compressive and shearing forces is the Ko-Kneader (List System) manufactured by Baker Perkins Inc., Saginaw, Mich., U.S.A., and described in U.S. Pat. 2,505,125. In the Ko-Kneader the dough-like material is intensively and continuously kneaded, squeezed and subjected to shearing forces, backward and forward movement taking place.

In accordance with a further aspect, the present invention consists in a method of making shaped articles for construction and insulation purposes comprising the steps of:

(a) Preparing a binder containing comminuted expanded perlite and calcium oxide or dry hydrated CaO, the molar ratio between $SiO_2$ in the perlite and the oxide or CaO in the hydroxide being about 1.1 to 2.0, sufficient water being added to produce a dough-like material, kneading the mixture at a temperature of between about 20 and 160° C. for about 2 to 10 minutes, adding water and holding the mixture at a temperature between about 60 and 95° C. for a period of about 10 minutes to 3 hours;

(b) Mixing the binder prepared in this manner with expanded perlite and/or vermiculite without substantially reducing the particle size of the perlite or vermiculite;

(c) Shaping the resulting mixture to produce articles;

(d) Treating the articles with saturated steam at a pressure between about 8 and about 40 kg./cm.$^2$ for about 1 to about 16 hours; and (e) Drying the articles.

In accordance with a preferred form of the invention there is added to the constituents of the binder, either during the production of the dough-like material or in subsequent heat treatment at about 60 to about 95° C. after adding of water, a mineralizing agent such as the fluoride of an alkali metal or an alkaline earth metal, preferably sodium fluoride and/or calcium fluoride. The quantity added can be between 1 and 3 percent of the weight of the solids in the binder.

If expanded perlite is used together with an expanded vermiculite, the choice of weight ratio between them is not restricted, that is to say any weight ratio can be used without leading to the manufacture of unusable products. However, it is preferred that 20 to 30 percent of expanded vermiculite should be used with 70 to 80 percent of expanded perlite.

A fibrous mineral material can be added during or before the mixing step (b), for instance asbestos fibers or glass fibers, in an amount equal to 0.5 to 3 percent by weight.

The articles can be produced with reinforcing means such as glass fiber fabric or mats of glass fibers. It is also possible to use steel wire netting or steel wire fabric. For the production of articles with water repelling or waterproof properties water-repellants, such as silicones, can be added in a quantity equal to 0.2 to 1.2 percent by weight.

The quantity of binding agent is generally 15 to 40 percent by weight, based on its solids content, or preferably 25 to 35 percent. Therefore, hundred parts of the shaped articles contain 15 to 40 parts by weight of solids of the binder.

The higher the pressure in the treatment of the shaped articles with saturated steam, the shorter is the time necessary. By suitable choice of the proportions between the components and a corresponding performance of the process it is possible to manufacture light, non-inflammable shaped articles which have very good thermal and acoustic insulating properties and keep their dimensions. Surprisingly such products do not undergo any structural alterations even at temperatures as low as that of liquid air (−180° C.) or as high as about 940° C. The structures are very resistant to thermal shock.

The method in accordance with the invention can be carried out continuously or discontinuously in a technically simple manner.

Figure 2:
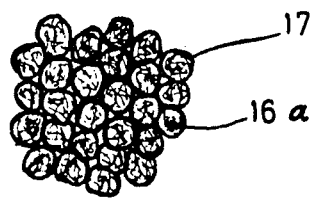
Figure 3:
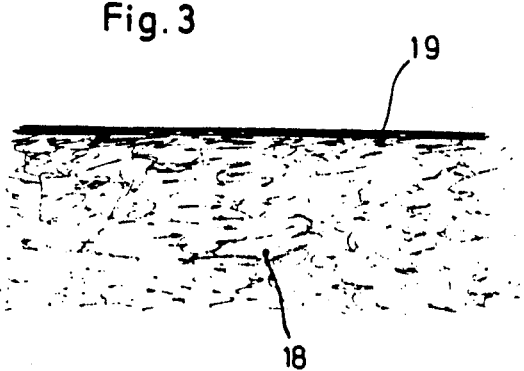

The invention will now be further explained with reference to the accompanying drawings, in which FIG. 1 is a schematic view of a preferred plant for carrying out the method of the invention for producing the binding agent or binder, and shaped articles;

FIG. 2 diagrammatically shows the fine structure of shaped articles of expanded perlite, produced in accordance with the invention; and FIG. 3 is a diagrammatic section of a laminate in accordance with the invention.

In accordance with the arrangement shown in FIG. 1, expanded perlite dust or waste is conveyed from the container 1 by a weighing device to a kneader 3. Calcium oxide or dry hydrated lime supplied from the storage container 2 is fed, together with water from the container 4 into the charging screw conveyor of the kneader 3. Preferably the kneader is of the type which can be heated, and is sold under the name "Ko-Kneader." The quantity of water added is such that it is sufficient for hydrating the CaO (if used) and for obtaining a final moisture content of 16 to 25 percent so that a dough-like material is produced. The mass is treated in the kneader 3 for about 2 to 10 minutes. By heating the kneader the mass can be heated to a temperature of up to about 160° C. Care is to be taken that the moisture content of the mass remains between about 16 to 25 percent. Next the kneaded mass having the consistency of a dough-like material is passed into a container 5 where, after the addition of a quantity of water equal to about 3 to 9 parts by weight for each part by weight of the solids into the mass, it is heated by means of a heating device 6 to about 60 to 95° C. and is held at this temperature between about 10 minutes and 3 hours while being stirred. Preferably mineralizing agents are added from the container 16 at the beginning of or during the step together with mineral fibers from the container 7. The production of the binder is now completed.

The binder, which is now in a jelly-like condition, is next introduced with expanded perlite and/or vermiculite from the container 8 into a mixer 9 where gentle mixing takes place for 2 to 5 minutes, care being taken to see that there is no substantial reduction in the size of the particles of the perlite or vermiculite or both. The mixture of binder and expanded perlite or vermiclite is then passed into suitable molds such as mold 15 of the required shape. The molded parts are then introduced into an autoclave 10 and treated under hydrothermal conditions, that is to say in a saturated steam atmosphere at a pressure of about 8 to 40 kg./cm.$^2$ for about 1 to 16 hours. The steam is introduced into the autoclave through a valve 12. On reaching the desired pressure, the supply of steam is interrupted. The autoclave is heated with the help of a heating device 11. The treated shaped articles are removed from the autoclave and dried, for example, in a drying chamber 13 at 20 to 220° C. until the material has a final moisture content of 1 to 3 percent by weight. The regulation of temperature can be carried out automatically by a temperature regulator 14.

Shaped articles in accordance with the invention consist of expanded perlite or vermiculite embedded in a matrix of perlite dust and quasi-colloidal binding agent which is presumed to comprise mixed or hybrid crystals of calcium silicate hydrate, calcium aluminosilicate hydrate and calcium aluminate hydrate. In FIG. 2 reference numeral 16a denotes the expanded perlite particles which are surrounded by a matrix 17 of the binding agent or binder. FIG. 3. diagrammatically shows the construction of a laminated or composite layer material in accordance with the invention. The core layer 18 consists of a shaped article produced in accordance with the invention, that is to say made of expanded perlite and/or vermiculate and the new binding agent. The cover sheet 19 can consist of conventional material. The core part can be covered on both sides with a covering sheet.

Shaped articles produced in accordance with the invention can have a specific gravity of 140 to 380 kg./m.³ and a thermal conductivity of 0.03 to 0.085 kcal./m. h.° C. at 20° C.

The production of laminated articles using shaped articles produced in accordance with the invention can be carried out in accordance with generally known methods, for example, the shaped article, such as a panel or plate, can be provided on at least one of its surfaces with an adhesive or binding agent, for example, a phenol formaldehyde precondensate, urea resin, polyurethane resin, silicone resin, rubber resin or with the binding agent in accordance with the invention. Then, as a cover or top layer a conventional material such as a mat of glass fibers, a glass fiber reinforced synthetic resin panel, a synthetic resin foil or panel, roofing felt, an aluminum or other metal foil, or steel sheet is applied, using pressure, if necessary. The covering sheet can also be coated with the binding agent in order to produce a better bonding action.

The invention will now be described with reference to the following examples.

EXAMPLE 1

(A) Production of the binding agent

Powder or dust having a particle size of 0.01 to 1 mm. from expanded perlite with a 85 percent $SiO_2$ content was used. 30 kg. of this material were mixed together with 40 kg. of calcium oxide and in addition with 120 liters of water in the supply hopper of a kneader and then kneaded for 3 minutes. The kneaded mass had the consistency of dough and was emptied into a container and mixed with 500 liters water. The mixture was stirred with a propeller-type stirrer and was heated to 90° C. within 30 minutes. The binder so produced was jelly-like.

(B) Production of a panel or slab

The binding agent so produced was gently mixed with 250 kg. of expanded perlite in a mixer for 3 minutes. The mixture was pressed to a slab with a diameter of 15 cm. and a thickness of 3 cm. in a shaping press at a pressure of 8 kg./cm.². The slab was then placed in an autoclave and treated for 6 hours at a pressure of 16 kg./cm.² and at a temperature of about 200° C. in the presence of saturated steam. Next, the slab was dried for 3 hours in a drying oven at 200° C. The product obtain had a specific gravity of 185 kg./m.³ and a thermal conductivity of 0.05 kcal./m. h.° C. at 20° C.

EXAMPLE 2

The method of Example 1 was repeated with the modification that 1.5 kg. asbestos fibers were added to the mixture having the consistency of a dough-like material. The final product had a specific gravity of 170 kg./m.³ and a thermal conductivity of 0.045 kcal./m. h. 5° C. at 20° C.

EXAMPLE 3

The method of Example 1 was carried out with the modification that 2 kg. sodium fluoride were incorporated in the dough-like material as a mineralizing agent. The product obtained had a specific gravity of 165 kg./m.³ and a thermal conductivity of 0.048 kcal./m. h. ° C. at 20° C.

EXAMPLE 4

15 kg. of the perlite dust as used in Example 1, 10 kg. of fine quartz, 40 kg. calcium oxide and 120 liter water were mixed together in the supply hopper of a kneader, and kneaded in the kneader itself for 3 minutes at 95° C. The mass which had the consistency of dough-like material was further treated in accordance with the method of Example 1. The binding agent obtained was mixed gently with 270 kg. of expanded perlite and the resulting mixture pressed to shape. After this the material was treated for 8 hours in an autoclave with saturated steam at a pressure of 16 kg./cm.² and at a temperature of about 200° C. After drying, a product with a specific gravity of 160 kg./m.³ and a thermal conductivity of 0.042 kcal./m. h. ° C. at a temperature of 20° C. was obtained.

EXAMPLE 5

30 kg. of the expanded perlite dust used in Example 1 were mixed together with 40 kg. of calcium oxide and 120 liter water and then kneaded in a Ko-Kneader at 90° C. for three minutes. The kneaded mass which had the consistency of a dough-like material was placed in a container and mixed with 500 liter water, 2 kg. of asbestos fibers and 0.7 kg. sodium fluoride. The mass, kept in movement by stirring, was heated to 90° C. within 30 minutes. The jelly-like binder obtained was then introduced into a mixer, mixed with 250 kg. expanded perlite and gently mixed for 3 minutes. The mixture was placed in a layer 3 cm. high on a sheet metal tray and treated in an autoclave for 6 hours at a pressure of 16 kg./cm.² with saturated steam at a temperature of about 200° C. The plate or slab produced was removed from the supporting tray and dried in a drying oven for 4 hours at 180° C. The plate had a specific gravity of 140 kg./m.³ and a thermal conductivity of 0.038 kcal./m. h. ° C. at 20° C.

EXAMPLE 6

A binder was produced in the manner described in Example 1 with the modification that the calcium oxide was replaced by dry hydrated lime in a quantity equivalent to 40 kg. of calcium oxide. The binding agent obtained was mixed with 240 kg. expanded vermiculite in a mixer. The mixture was then shaped in accordance with Example 1, treated in an autoclave with saturated steam, and then dried. The product obtained had a specific gravity of 205 kg./m.³ and a thermal conductivity of 0.067 kcal./m. h. ° C. at 20° C.

EXAMPLE 7

30 kg. of the expanded perlite powder used in Example 1 were mixed with 50 kg. calcium oxide and 140 liter water and then kneaded in a Ko-Kneader for 5 minutes at 80° C. The kneaded mass which had the consistency of a dough-like material was then placed in a container and mixed with 600 liter water, 3 kg. asbestos fibers and 1 kg. sodium fluoride. The mass was kept in motion by a stirrer and heated at 85° C. for 45 minutes. The jelly-like binder produced in this manner was mixed in a mixer with 350 kg. expanded perlite and mixed gently with it for 5 minutes. The mixture was pressed in the manner described in Example 1 in a shaping press at a pressure of 12 kg./cm.² to form a slab or plate, which was then treated in an autoclave for 8 hours at 200° C. in saturated steam at a pressure of 16 kg./cm.². The product obtained had a specific gravity of 149 kg./m.³ and a thermal conductivity of 0.04 kcal./m. h. ° C. at 20° C.

EXAMPLE 8

The method of Example 7 was repeated, but instead of expanded perlite a mixture of 6 kg. expanded vermiculite and 24 kg. expanded perlite was used. The product obtained had a specific gravity of 155 kg./m.³ and a thermal conductivity of 0.044 kcal./m. h. ° C. at 20° C.

EXAMPLE 9

A perlite plate or panel produced in accordance with Example 5, measuring 40 by 100 by 3 cm. was coated on its top and bottom surfaces with a resol having a viscosity of 3,000 cps. which had been produced by alkaline condensation of 1 mole of phenol with 2 moles of formaldehyde. Two hard fiber panels measuring 40 by 100 by 0.5 cm. were then coated each on one side with a thin layer of phenol formaldehyde precondensate. The hard fiber plates were then laid against the perlite plate and pressed in a heated mold at 140° C. for about 10 minutes. The resulting laminate had good insulating properties and could be used for construction purposes, for example, the construction of residential houses.

EXAMPLE 10

A perlite panel or plate produced in accordance with Example 7 measuring 40 by 100 by 3 cm. was coated on its upper surface with a metal bonding adhesive based on polyisocyanate. The adhesive was produced shortly before use by mixing a solution of 80 parts by weight of a branched adipic acid butyleneglycol technical quality hexanetriol polyester in 20 parts by weight ethyl acetate with 120 parts by weight of Desmodur L® (produced by Farbenfabriken Bayer, Leverkusen, Germany). Desmodur L consists of a mixture of low molecular weight polyurethanes of the following general formula

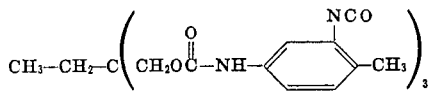

After it had been degreased by means of trichloroethylene and aqueous sodium carbonate solution, followed by washing with water and drying for 10 minutes at 150° C., aluminum foil was placed on the adhesive covered surface. The laminate was bonded in a press at a pressure of 5 kg./cm.$^2$ for 15 minutes at 130° C.

The laminate produced was suitable for cladding external walls, as an insulating material for chemical plants, for roofing purposes, and also in surface vehicle and aircraft construction.

Instead of the polyisocyanate adhesive, it is also possible to use a methylsilicone resin as a bonding agent as described, for instance, in U.S. Pat. 2,398,672. In this case, the laminate is heated for about 10 minutes at 100° C. and then pressed with a force of 5 kg./cm.$^2$ at 200° C. for 10 minutes.

EXAMPLE 11

Example 10 was repeated with the modification that the binder produced in Example 1(A) was used as a binding agent. The laminated material was sprayed with a small quantity of water and treated in a press at 10 kg./cm.$^2$ for 30 minutes at 200° C.

The aluminum covering layer of the laminate proved to be very well bonded in position.

While specific embodiments of the invention have been shown and described in detail to illustrate the application of the inventive principles, it will be understood that the invention may be embodied otherwise without departing from such principles.

What is claimed is:
1. A method of making shaped articles for construction and insulation purposes comprising
 (a) preparing an inorganic binder by mixing expanded perlite with calcium oxide or dry hydrated calcium oxide in a molar ratio of 1 mol SiO$_2$ in the perlite to 1.1 to 2.0 mol CaO in the calcium oxide or dry hydrated calcium oxide, adding water to form a material having a dough-like consistency and a moisture content of about 16 to 25 percent, kneading the dough-like material at a temperature of between 20 to 160° C. for about 2 to about 10 minutes, adding further water, in an amount corresponding to about 3 to 9 parts by weight for each part by weight of the solids, and then heating the material to a temperature of between about 60 and 95° C. for a period of about 10 minutes to about 3 hours;
 (b) mixing the binder obtained according to step (a) with expanded perlite, expanded vermiculite, or a mixture thereof, without substantially reducing the particle size of the perlite or vermiculite;
 (c) shaping the resulting mixture to produce articles;
 (d) treating the articles with saturated steam at pressure between about 8 and about 40 kg./cm.$^2$ for about 1 to about 16 hours;
 (e) drying the articles; and
 (f) the mixing in step (b) being in such proportions that the amount of binding agent used is such that its solids content makes up about 15 to 40 percent by weight of the article.

2. A method according to claim 1, in which in step (c) a mineralizing agent is added, said mineralizing agent being sodium fluoride, calcium fluoride, or a mixture thereof, said mineralizing agent being added in a quantity equal to 1 to 3 percent by weight of the binder.

3. A method according to claim 1, in which before the step (c) a fibrous mineral material is added.

4. A method according to claim 1, in which the perlite used for making the binder of step (a) is perlite dust or waste having a particle size of approximately 0.001 to approximately 3 mm.

5. A method according to claim 1, in which the particle size of the perlite used in making the binder of step (a) is between 0.01 and 1 mm.

References Cited
UNITED STATES PATENTS

| | | | |
|---|---|---|---|
| 3,317,327 | 5/1967 | Matsuda et al. | 106—97 |
| 3,227,570 | 1/1966 | Bishop | 106—120 |
| 2,698,251 | 12/1954 | Shea et al. | 106—120 |
| 2,517,235 | 8/1950 | Pierce | 106—120 |
| 2,483,498 | 10/1949 | Lewon et al. | 264—333 |
| 2,432,981 | 12/1947 | Abrahams et al. | 264—333 |
| 2,105,324 | 1/1938 | Huttemann et al. | 106—120 |
| 2,575,599 | 11/1951 | Silverman et al. | 106—90 |

TOBIAS E. LEVOW, Primary Examiner

W. T. SCOTT, Assistant Examiner

U.S. Cl. X.R.

106—85, 97, 98, 84, 99, 120, (Perlite Digest); 264—82, 333